Jan. 4, 1944. J. J. McDONALD 2,338,290
TRAY RACK
Filed April 21, 1943 2 Sheets-Sheet 2

Inventor.
John J. McDonald
by John H. McKenna
Attorney.

Patented Jan. 4, 1944

2,338,290

UNITED STATES PATENT OFFICE 2,338,290

TRAY RACK

John J. McDonald, Newton, Mass.

Application April 21, 1943, Serial No. 483,895

2 Claims. (Cl. 211—41)

This invention relates to improvements in tray racks.

More especially it provides an improved rack for holding a large number of thin trays and more particularly food trays having provision for holding individual portions of different foods deposited directly on the trays, such as are used in army camps and which may be used wherever large numbers of people are to be served with food cafeteria style. The invention conveniently may be mobile for movement from place to place, such as from a kitchen or other location where freshly washed trays may be mounted in the rack to a location where patrons can pass to either side of the rack and each patron conveniently may remove a tray as he moves toward the counter or other place of dispensing of food.

It is among the objects of the invention to provide a tray rack of the general type above described having provision for circulation of air into contact with approximately all portions of the surface of each of a multiplicity of trays held edgewise on the rack in one or more rows, the trays in each row having edges projected to positions facilitating easy withdrawal and insertion of the individual trays from either side of the rack. When such food trays, freshly washed and warm, are stacked so that one rests directly on another, as has been customary heretofore so far as I am aware, the trays acquire odors which are not only objectionable to patrons but indicate or suggest on unsavory and unsanitary condition of the trays. The present invention provides ventilation for the trays in the rack thereby eliminating objectionable odors and promoting a generally more sanitary condition of the trays as well as providing a convenient and more expeditious manner of handling the trays in large numbers.

Another object of my invention is to provide for supporting the trays in the rack at their under edges only at a generally mid-location along their edges, whereby such under edge support when free of trays has large side space at each side of it facilitating loading of trays into the rack at a lower level.

A further object is to provide a durably strong but light mobile tray rack which may be easily pushed from place to place as desired.

It is, moreover, the purpose and object of my invention generally to improve racks for holding and maintaining food trays in a generally sanitary condition.

Figure 1:
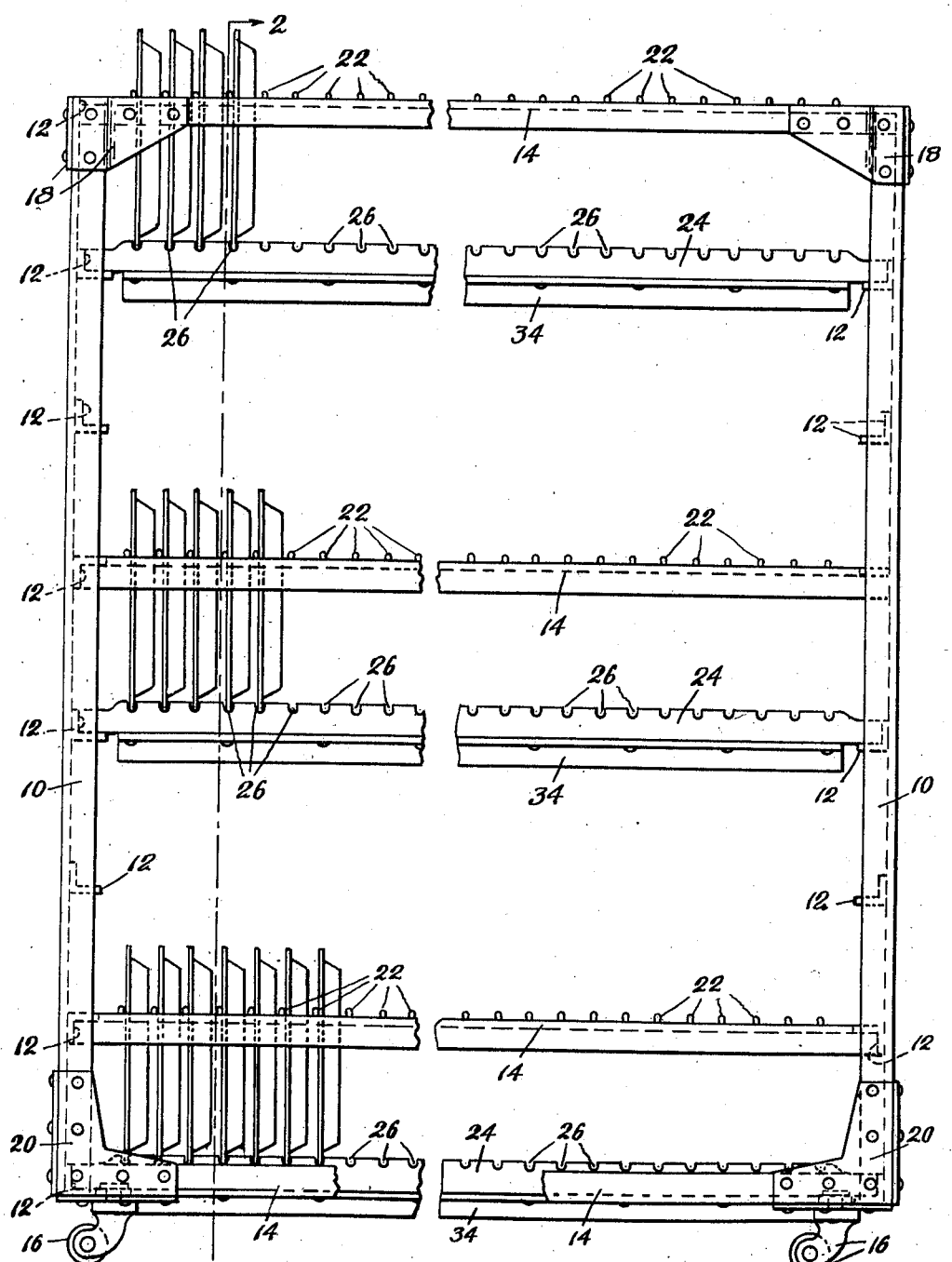
Figure 1 is a side elevation of a mobile tray rack embodying features of my invention, a mid- portion thereof being broken away, and several trays being shown mounted in the rack.
Figure 2:
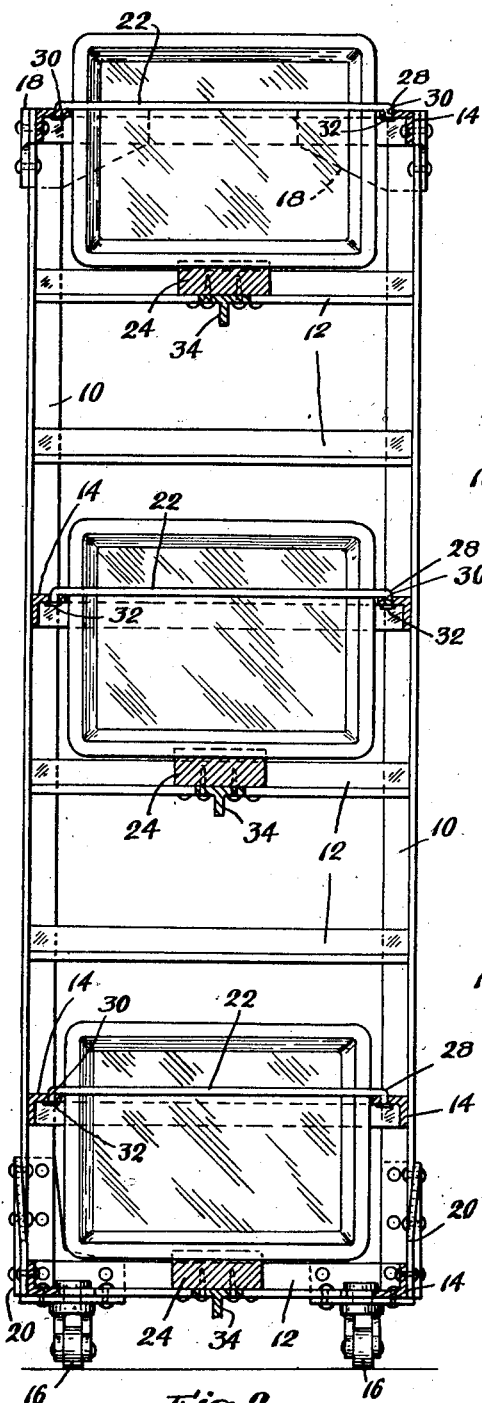
Figure 2 is a vertical sectional view on line 2—2 of Figure 1.
Figure 3:
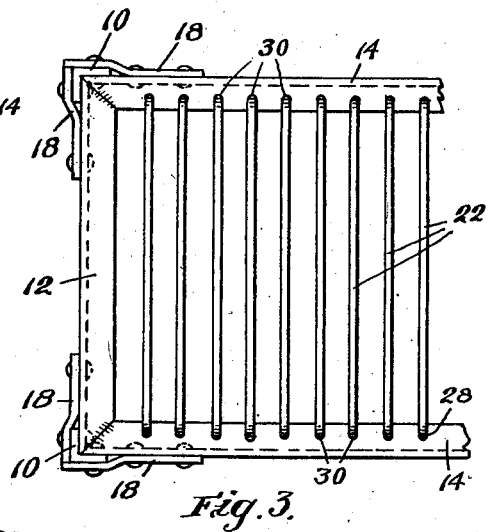
Figure 3 is a top plan view of one end portion of the rack of Figures 1 and 2 but empty of trays.
Figure 4:
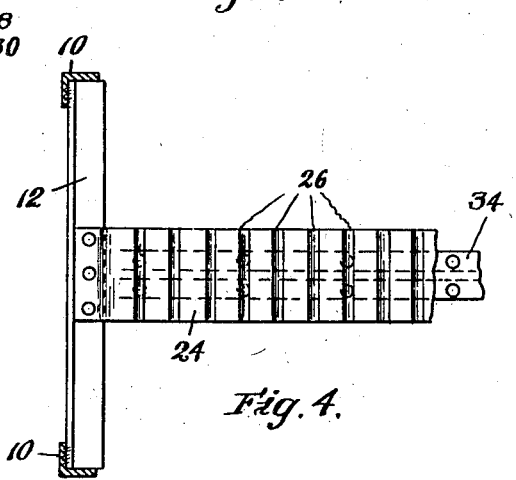
Figure 4 is a sectional plan view showing an end portion of one of the grooved under-supports for the trays.

Referring to the drawings, my improved tray rack is illustrated as having four corner uprights 10, connected together by end cross bars 12 and side cross bars 14 to provide a rectangular frame. As represented, the frame is of angle iron construction designed to accommodate three rows of trays in spaced relation, one above the other. Castors or wheels 16 are suitably mounted at the lower end of each upright 10 making the rack mobile and also elevating the rack proper above the floor so that air can circulate around the lower edges and upward between trays in the lowermost row of trays. Preferably upper corner braces 18 and lower corner braces 20 are provided to lend rigidity and strength to the frame.

The tray retainers and supports may be considered identical for each of the illustrated three rows of trays. The retainers consist of a multiplicity of rods 22 extending transversely across the frame from one to another of the side bars 14. The rods are spaced equally apart in parallelism, providing a narrow space between each two rods through which a tray may be inserted or removed from between the side bars 14. At a suitable level below the rods 22, a notched bar 24 extends from end to end of the frame, being secured to an end cross bar 12 at each end, and constituting a spacing under support for the individuals of a row of trays. Preferably the notched bar 24 is of wood of width considerably less than the width of the rack frame, and it is located centrally under the multiplicity of rods 22 so that, when no trays are in this particular support, there is open space at each side of the notched bar 24 and below the side bars 14, facilitating insertion and removal of trays to and from a lower tray holder of the rack.

The notches 26 in bar 24 equal in number the spaces between rods 22 above, and each notch preferably is arranged vertically under a space between rods for receiving the edge flange of a tray inserted in said space. Each rod 22 has substantial diameter so that it constitutes a fairly rigid spacer between trays at an upper region while the notches 26 definitely retain the lower edges of the trays in spaced relation. This ensures space between adjacent trays within which air may circulate freely to promote a sanitary condition of the trays.

As shown in the drawings the rods 22 have bent ends 28 extending through holes 30 in the side bars 14 and maintained by swaging of their ends as at 32 on the under side of the adjacent side bars. However any suitable spacing elements may be employed for this purpose, secured to the frame in any convenient way. When the notched supporting bar 24 is of wood, I prefer to brace it against sagging, as by a metal brace bar 34 secured along its under side. There is definite advantage in using wooden rather than metal supporting bars 24 in that the wood is less likely to nick and deform the tray flanges as the trays are inserted and sometimes dropped to supported positions in the rack.

Although the drawings illustrate trays having plane bottoms, it should be understood that they are merely representative of trays generally and more particularly trays designed to receive individual portions of food directly thereon, which trays usually have ribs defining a plurality of shallow sections in each tray.

In use, my improved tray rack, filled with clean trays, may be wheeled to a station in a camp, industrial plant, or the like, and persons approaching a food counter or other dispensary may pass to either side of the rack, each lifting out a food tray without delay or confusion. Meanwhile, the trays are maintained out of contact with each other and air can circulate freely around approximately the entire surface of each individual tray, thus promoting a generally more sanitary condition of the trays and eliminating much of the heretofore almost universal complaint that stagnant food odors have persisted on the trays after reasonably thorough washing thereof, primarily due to the close stacking and nesting of freshly washed trays. The rack may be easily moved from place to place as may be desired, and may be adjusted as to position to most efficiently serve the requirements at any particular location. It is durable and strong for successfully withstanding such rough treatment as may be imposed upon it.

I claim as my invention:

1. A tray rack comprising a rectangular frame having corner uprights and horizontal bars connecting the uprights and extending in spaced relation along each side and each end of the frame, a multiplicity of spaced parallel spacing members disposed between the two sides of the frame in a horizontal plane and supported by an oppositely disposed pair of said connecting bars at the sides of the frame, and a notched rigid bar extending from end to end of the frame centrally of and at a distance below said spacing members, and supported by an opposed pair of said connecting bars at the ends of the frame, said notched bar being substantially narrower than the frame and having its notches parallel with said spacing members and disposed each approximately-vertically below a space between said spacing members.

2. A tray rack for holding a multiplicity of food trays on edge in slightly spaced relation in a plurality of rows spaced one above another, said rack comprising a rectangular frame having upright members and horizontal bars connecting the upright members, a series of transverse parallel spacing members mounted on the frame in a common horizontal plane, a rigid notched longitudinal tray-supporting member extending from end to end of the frame centrally below the spacing members and in a parallel plane, said notched supporting member being much narrower than the frame, a second series of transverse parallel spacing members mounted on the frame in a common horizontal plane spaced below said notched supporting member, and a second rigid notched longitudinal tray-supporting member extending from end to end of the frame centrally below the second series of spacing members and in a parallel plane, each of said tray-supporting members being mounted on a pair of opposed horizontal bars, and each of the upper and lower spacing members with their respective supporting bars being adapted to receive a row of trays therein with ventilation space between adjacent trays, and the space at each side of the upper supporting member, when free of trays, providing space facilitating insertion and removal of trays to and from the lower support.

JOHN J. McDONALD